(12) United States Patent
Furutani et al.

(10) Patent No.: US 12,019,666 B2
(45) Date of Patent: Jun. 25, 2024

(54) ABSTRACT GENERATION APPARATUS, ABSTRACT GENERATION METHOD AND PROGRAM

(71) Applicant: NIPPON TELEGRAPH AND TELEPHONE CORPORATION, Tokyo (JP)

(72) Inventors: Takashi Furutani, Tokyo (JP); Akira Takeuchi, Tokyo (JP); Yuriko Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/906,497

(22) PCT Filed: Mar. 23, 2020

(86) PCT No.: PCT/JP2020/012589
§ 371 (c)(1),
(2) Date: Sep. 16, 2022

(87) PCT Pub. No.: WO2021/191938
PCT Pub. Date: Sep. 30, 2021

(65) Prior Publication Data
US 2023/0146583 A1 May 11, 2023

(51) Int. Cl.
*G06F 16/34* (2019.01)
*G06F 40/268* (2020.01)

(52) U.S. Cl.
CPC .......... *G06F 16/345* (2019.01); *G06F 40/268* (2020.01)

(58) Field of Classification Search
None
See application file for complete search history.

(56) References Cited

U.S. PATENT DOCUMENTS

| | | | |
|---|---|---|---|
| 2013/0138586 A1* | 5/2013 | Jung | G06N 20/00 706/14 |
| 2021/0192126 A1* | 6/2021 | Gehrmann | G06N 20/00 |
| 2021/0334464 A1* | 10/2021 | Zhang | G06F 40/30 |

OTHER PUBLICATIONS

Galsurkar et al., "Assessing national development plans for alignment with sustainable development goals via semantic search." In Proceedings of the AAAI Conference on Artificial Intelligence, vol. 32, No. 1. 7753-7758 (2018). (Year: 2018).*

(Continued)

*Primary Examiner* — Frank D Mills
(74) *Attorney, Agent, or Firm* — IPUSA, PLLC (57) ABSTRACT

A summary generation unit includes a processor and a memory storing program instructions that cause the processor to: extract, based on components of text data regarding an Information and Communication Technology (ICT) service, one or more pieces of first feature information from the text data; a extract, based on components of a target belonging to a goal of sustainable development goals (SDGs), one or more pieces of second feature information from the target; determine a degree of similarity between the first feature information and each of the one or more pieces of second feature information; and generate a result of a cluster analysis of a set of the components that correspond to a piece of second feature information having the similarity equal to or more than a threshold among the one or more pieces of second feature information, the result of the cluster analysis being a summary of the goal.

9 Claims, 11 Drawing Sheets

(56) References Cited

OTHER PUBLICATIONS

Pincet, A., S. Okabe and M. Pawelczyk (2019), "Linking Aid to the Sustainable Development Goals—a machine learning approach", OECD Development Co-operation Working Papers, No. 52, OECD Publishing, Paris, https://doi.org/10.1787/4bdaeb8c-en. (Year: 2019).*

Sarkar, Kamal, Khushbu Saraf, and Avishikta Ghosh. "Improving graph based multidocument text summarization using an enhanced sentence similarity measure." In 2015 IEEE 2nd International Conference on Recent Trends in Information Systems (ReTIS), pp. 359-365. IEEE, 2015. (Year: 2015).*

Liu, Shixia, Michelle X. Zhou, Shimei Pan, Yangqiu Song, Weihong Qian, Weijia Cai, and Xiaoxiao Lian. "Tiara: Interactive, topic-based visual text summarization and analysis." ACM Transactions on Intelligent Systems and Technology (TIST) 3, No. 2 (2012): 1-28. (Year: 2012).*

Deloitte Tohmatsu Consulting LLC, "Final Report about Possibility of SDGs Business and Rulemaking", Dec. 2017.

Takashi Furutani et al., "A study of contribution to Sustainable Development Goals (SDGs) by ICT services", Mar. 19, 2019.

Jonathan Galsurkar et al., The AAAI Conference on Artificial Intelligence, "Assessing national development plans for alignment with sustainable development goals via semantic search", vol. 32, No. 1, 2018, pp. 7753-7758.

Yohei Seki et al., 66th (2004) National Conference Lecture Collection (2), "Multi-Document Summarization using Sentences Types", Mar. 9, 2004, pp. 2-61~2-62.

\* cited by examiner

| SDG | REDEFINED TARGET |
|---|---|
| 1 | MEASURES AGAINST POVERTY |
| | SOCIAL SECURITY SYSTEMS |
| | ENSURING OWNERSHIP RIGHT AND MANAGEMENT RIGHT OF FORTUNE |
| | ENSURING ACCESS TO BASIC SERVICES |
| | BUILDING RESILIENCE OF POVERTY CLASS AGAINST DISASTERS |
| 2 | SAFE AND STABLE SUPPLY OF FOOD |
| | ENDING INADEQUATE NUTRITION |
| | SUSTAINABLE FOOD PRODUCTION SYSTEM HIGHLY ADAPTABLE TO CLIMATE CHANGE |
| | IMPROVING AGRICULTURAL PRODUCTIVITY |
| | MAINTAINING GENETIC DIVERGENCE OF ANIMALS AND PLANTS AND ACCESS TO KNOWLEDGE |
| | EASY ACCESS TO MARKET INFORMATION |
| 3 | REDUCING DEAD RATE |
| | ELIMINATING CATCHING DISEASES AND COMMUNICABLE DISEASES |
| | PREVENTING AND CURING DRUG ABUSE AND ALCOHOL DEPENDENCE |
| | REDUCING SMOKER RATE |
| | ACCESS TO HEALTH INSURANCE SERVICES |
| | DEVELOPING MEDICAL PERSONNEL |
| | EARLY WARNING AND MANAGING HEALTH RISK FACTORS |

Fig. 7

| | |
|---|---|
| 4 | ACCESS TO LEARNING ENVIRONMENTS |
| | OBTAINING TECHNICAL AND PROFESSIONAL SKILLS (PARTICULARLY ICT SKILLS) |
| | OBTAINING READ AND WRITE CAPABILITY AND FUNDAMENTAL CALCULATION CAPABILITY |
| | EDUCATION FOR SUSTAINABLE DEVELOPMENT |
| | PROVIDING SAFE, NON-VIOLENT, AND EFFECTIVE LEARNING ENVIRONMENTS |
| | DEVELOPING INSTRUCTORS |
| 5 | ELIMINATING DISCRIMINATION, VIOLENCE, AND BAD CONVENTION AGAINST ALL WOMEN AND GIRLS |
| | PROMOTING GENDER EQUALITY |
| | RECOGNIZING AND EVALUATING BABY AND CHILD CARE, CAREGIVING, AND DOMESTIC LABOR WITHOUT PAY |
| | ENSURING CHANCES OF WOMEN'S PARTICIPATION AND LEADERSHIP |
| | ENSURING OWNERSHIP OF FORTUNE ETC. |
| | PROMOTING ENHANCEMENT OF WOMEN'S CAPABILITY BY ICT |
| 6 | IMPROVING WATER QUALITY |
| | STABLE SUPPLY AND EFFICIENT USE OF WATER |
| | MANAGING WATER RESOURCES ACROSS BORDERS |
| | PROTECTING WATER-RELATED ECOSYSTEMS |
| | POLICIES IN WATER AND SANITATION SECTORS |

Fig. 8

| | |
|---|---|
| 7 | ACCESS TO MODERN ENERGY SERVICES |
| | DEVELOPING AND INVESTING CLEAN ENERGY AND RESILIENT ENERGY INFRASTRUCTURES |
| | IMPROVING USE EFFICIENCY OF ENERGY |
| | PROMOTING INTRODUCTION OF RENEWABLE ENERGY |
| 8 | CONTINUING ECONOMIC GROWTH |
| | IMPROVING TECHNIQUE AND PROMOTING INNOVATION TOWARD IMPROVEMENT OF LABOR PRODUCTIVITY |
| | SUPPORTING ESTABLISHMENT AND GROWTH OF SMALL-TO-MEDIUM BUSINESS |
| | IMPROVING USE EFFICIENCY OF RESOURCES |
| | ACHIEVING EQUAL PAY FOR EQUAL WORK |
| | REDUCING RATE OF NEET (OPPORTUNITY OFFER) |
| | ELIMINATING CHILD LABOR |
| | PROMOTING SECURE AND SAFE LABOR ENVIRONMENT |
| | PROMOTING SUSTAINABLE TOURIST BUSINESS |
| 9 | BUILDING SUSTAINABLE AND RESILIENT INFRASTRUCTURE |
| | PROMOTING SUSTAINABLE INDUSTRIALIZATION |
| | ENSURING ACCESS TO FINANCING SERVICES AND MARKET BY SMALL-SCALE INDUSTRY |
| | BUILDING INFRASTRUCTURE AND INDUSTRY GIVING CONSIDERATION TO HIGH RESOURCE UTILIZATION RATE AND ENVIRONMENT |
| | INCREASING RESEARCH AND DEVELOPMENT WORKERS |
| | PROVIDING UNIVERSAL AND INEXPENSIVE INTERNET ACCESS FOR LEAST DEVELOPED COUNTRIES |

Fig. 9

| | |
|---|---|
| 10 | IMPROVING INCOME GROWTH RATE OF LOW-INCOME CLASS |
| | STRENGTHENING CAPACITY OF ALL PEOPLE |
| | ENSURING EQUAL OPPORTUNITY AND CORRECTING INEQUALITY OF RESULTS |
| | STRENGTHENING INTERNATIONAL ASSERTIVENESS OF DEVELOPING COUNTRIES |
| | ORDERLY MIGRATION |
| | REDUCING CASH TRANSFER COST OF MIGRANT WORKERS |
| | STRENGTHENING PROTECTION AND PRESERVATION OF WORLD'S CULTURAL HERITAGE AND NATURAL HERITAGE |
| | ENSURING RESILIENCE AGAINST DISASTERS |
| | MANAGING DISASTER RISK |
| 11 | MANAGING AND IMPROVING AIR QUALITY AND WASTES |
| | SAFE AND EASE ACCESS TO GREEN SPACE AND PUBLIC SPACE |
| | SUSTAINABLE CITY AND RURAL PLANNING |
| | SUSTAINABLE AND RESILIENT ARCHITECTURE |
| | PROMOTING SUSTAINABLE CONSUMPTION AND PRODUCTION |
| | EFFICIENT USE OF NATURAL RESOURCES |
| | REDUCING FOOD LOSS |
| | MANAGEMENT AND EMISSION REDUCTION OF CHEMICAL SUBSTANCES AND WASTES |
| 12 | PRODUCTION REDUCTION, REUSE, AND RECYCLING OF WASTES |
| | SUSTAINABLE PUBLIC PURCHASE |
| | EDUCATING SUSTAINABLE DEVELOPMENT AND LIFESTYLE |
| | METHOD FOR EVALUATING EFFECTS OF SUSTAINABLE DEVELOPMENT ON TOURIST BUSINESS |

Fig. 10

| | |
|---|---|
| 13 | MEASURE AGAINST ADAPTABILITY |
| | IMPROVEMENT OF ADAPTABILITY, EARLY WARNING, AND PREDICTION |
| | EDUCATING RELAXATION, ADAPTABILITY, AND EARLY WARNING |
| | MEASURE AGAINST RELAXATION |
| 14 | MONITORING AND MEASURE AGAINST MARINE CONTAMINATION |
| | MEASURE AGAINST MARINE ACIDIFICATION |
| | MANAGING COAST AND PRESERVING ECOSYSTEMS |
| | GRASPING AMOUNT OF AQUATIC RESOURCES |
| | SUSTAINABLE FISHERY |
| | MANAGING AND REGULATING EXCESS FISHERY |
| | ACCESS TO MARKET BY SMALL FISHERY OPERATORS |
| 15 | CONSERVING FOREST AND PLANTING |
| | RECOVERING DEGRADED LAND |
| | ADDRESSING INVASIVE ALIEN SPECIES |
| | EQUAL ACCESS TO GENETIC RESOURCES |
| | MEASURE AGAINST FISH POACHING |
| | ADDRESSING ENDANGERED SPECIES |

Fig. 11

| | |
|---|---|
| 16 | ELIMINATING BRUTE FORCE AND PHYSICAL TORTURE |
| | ENSURING ACCESS TO JUDICIARY |
| | MONITORING ILLEGAL MONEY ARMS BUSINESS |
| | SIGNIFICANTLY REDUCING GRAFT AND BRIBERY |
| | HIGHLY TRANSPARENT PUBLIC INSTITUTION |
| | INCLUSIVE DECISION MAKING |
| | PROVIDING LEGAL IDENTIFICATION |
| | ENSURING PUBLIC ACCESS TO INFORMATION |
| 17 | PROMOTING GLOBAL PARTNERSHIP FOR SUSTAINABLE DEVELOPMENT |
| | FINANCIAL SUPPORT FOR DEVELOPING COUNTRIES |
| | PROVIDING INTERNET ACCESS FOR DEVELOPING COUNTRIES |

ABSTRACT GENERATION APPARATUS, ABSTRACT GENERATION METHOD AND PROGRAM

TECHNICAL FIELD

The present invention relates to a summary generation device, a summary generation method, and a program.

BACKGROUND ART

In 2015, "the 2030 Agenda for Sustainable Development" centered on sustainable development goals (SDGs) was adopted at the United Nations Summit. The SDGs include 17 goals and 169 targets and cover wide varieties from development support for developing countries such as poverty and hunger, health and education, and water safety to job satisfaction and economic growth, energy, climate changes, and biodiversity.

Contributions to social issues such as the SDGs are thought to be a market that brings great business opportunities and many companies have begun to consider solutions for these goals. In particular, ICT (Information and Communication Technology) service solutions are expected to contribute significantly to solving these social issues.

The meanings of the SDGs including the target documents need to be understood correctly to determine the goal of the SDGs to which each ICT service can contribute. Unless the targets are understood correctly, the original effects of ICT services not only may be overlooked, but also are at a risk of being overestimated.

However, the 169 targets are difficult to read because they are not numerical goals, but action goals. Since it is difficult for the evaluator who evaluates the relevance of ICC services to accurately understand the intentions of the 169 targets and grasp the causal relationship operationally, proper summarization in consideration of the causal relationship indicating contribution of ICT services is necessary.

Conventionally, for example, a keyword extraction method has been used to generate the goals that summarize the targets (Non Patent Literature 1).

CITATION LIST

Non Patent Literature

[NPL 1] "Final Report about Possibility of SDGs Business and Rulemaking", Deloitte Tohmatsu Consulting LLC, December 2017

SUMMARY OF THE INVENTION

Technical Problem

However, particularly in ICT services, the causal relationship with the targets to which ICT services contribute needs to be clarified, but the causal relationship cannot be clarified only by keywords, thereby making it difficult to obtain a summary that facilitates the decision of the goal to which a certain ICT service contributes.

For example, the keyword "land" is extracted in the keyword extraction from the target of goal 1 described in Non Patent Literature 1, but it is difficult to determine how an ICT service can contribute to this goal only by the word.

In addition, for example, when a target of goal 1 "By 2030, the proportion of men, women and children of all ages living in poverty in all its dimensions according to national definitions are reduced at least by half" is summarized by summarization (keyword extraction) using a commonly used dependency analysis, "in poverty ", "reduced at least by half", and the like are obtained.

However, the meaning of the sentence cannot be grasped easily and how the ICT service can contribute to the goal cannot be determined easily.

The present invention addresses the problem described above with an object of generating a summary that facilitates the decision of the goal of the SDGs to which an ICT service contributes.

Means for Solving the Problem

Accordingly, to solve the problem described above, there is provided a summary generation device including a first extraction unit that extracts, based on components of text data regarding an ICT service, one or more pieces of first feature information from the text data; a second extraction unit that extracts, based on components of a target belonging to a goal of SDGs, one or more pieces of second feature information from the target; a decision unit that decides similarity with the first feature information for each of the one or more pieces of second feature information; and a generation unit that generates, as a summary of the goal, a result of a cluster analysis of a set of the components that correspond to a piece of second feature information having the similarity equal to or more than a threshold among the one or more pieces of second feature information.

Effects of the Invention

It is possible to generate a summary that can facilitate the decision of the goal of SDGs to which an ICT service contributes.

DESCRIPTION OF EMBODIMENTS

Figure 1:
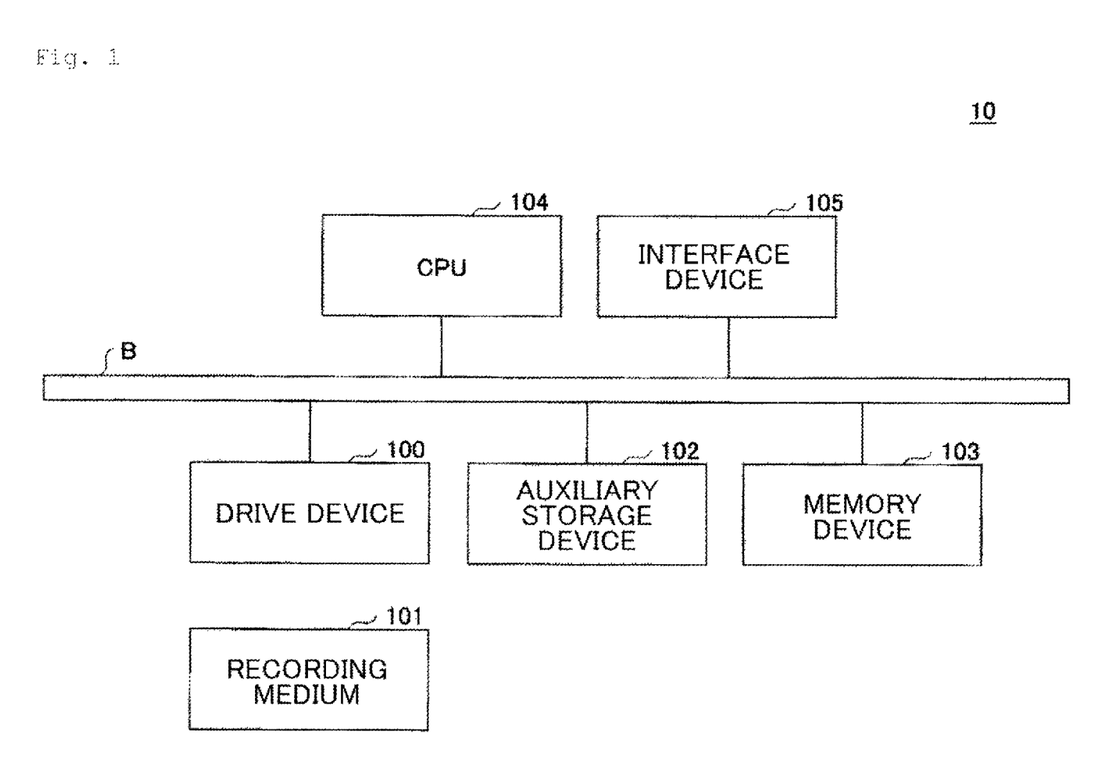
FIG. 1 is a figure illustrating an example of the hardware structure of a summary generation device 10 according to an embodiment of the present invention.

An embodiment of the present invention will be described with reference to the drawings. FIG. 1 is a figure illustrating an example of the hardware structure a summary generation device 10 according to an embodiment of the present invention. The summary generation device 10 in FIG. 1 includes a drive device 100, an auxiliary storage device 102, a memory device 103, a CPU 104, an interface device 105, and the like, which are connected to each other via a bus B.

The program that achieves processing in the summary generation device 10 is provided by a recoding medium 101 such as a CD-ROM. When the recoding medium 101 that stores the program is set in the drive device 100, the program is installed in the auxiliary storage device 102 from the recoding medium 101 via the drive device 100. However, the program does not necessarily have to be installed from the recoding medium 101 and may be downloaded from another computer via a network. The auxiliary storage device 102 stores the installed program as well as necessary files and data.

The memory device 103 reads the program from the auxiliary storage device 102 and stores the program when an instruction for starting the program is issued. The CPU 104 executes the function regarding the summary generation device 10 according to the program stored in the memory device 103. The interface device 105 is used as an interface for connecting to a network.

Figure 2:
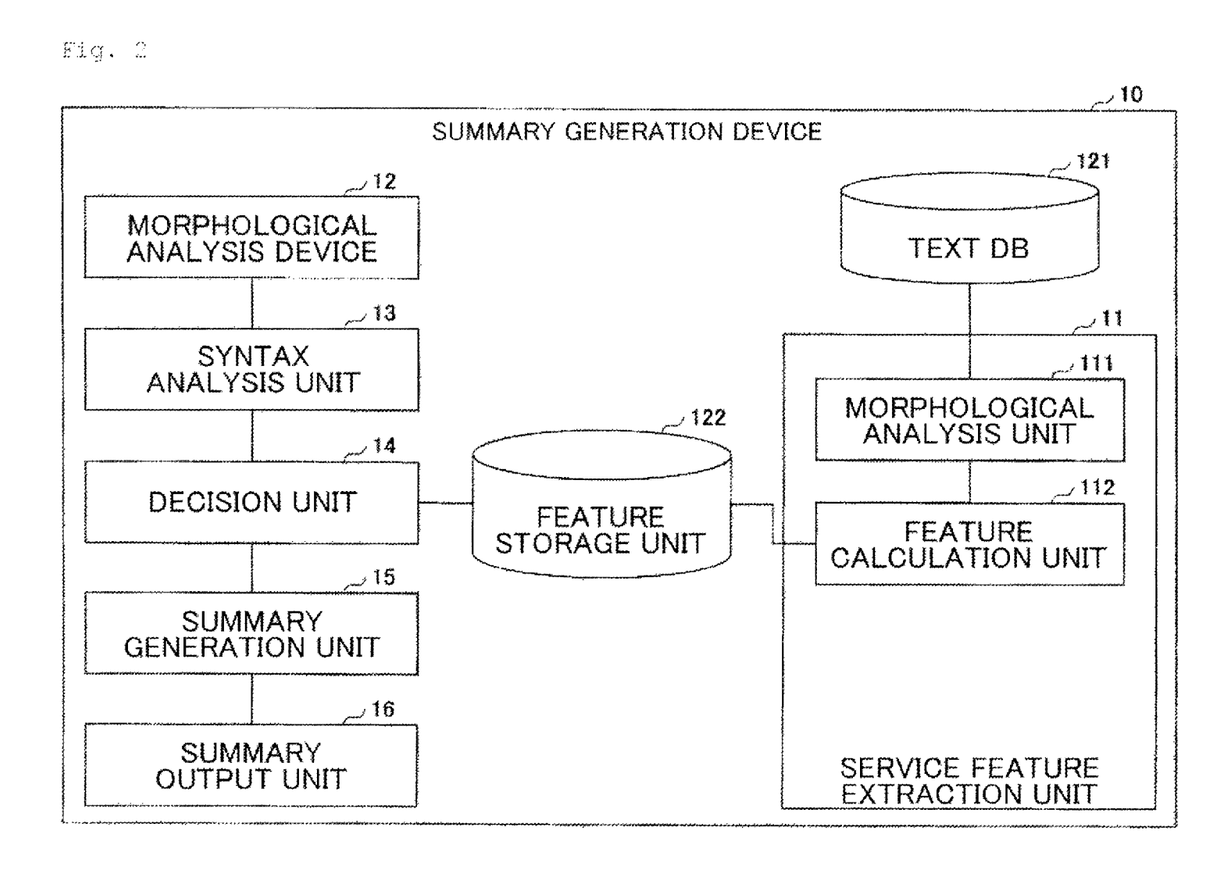
FIG. 2 is a figure illustrating an example of the functional structure of the summary generation device 10 according to the embodiment of the present invention.

FIG. 2 is a figure illustrating an example of the functional structure of the summary generation device 10 according to the embodiment of the present invention. In FIG. 2, the summary generation device 10 includes a service feature extraction unit 11, a morphological analysis unit 12, a syntax analysis unit 13, a decision unit 14, a summary generation unit 15, a summary output unit 16, and the like. In addition, the service feature extraction unit 11 includes a morphological analysis unit 111 and a feature calculation unit 112. These units are achieved by causing the CPU 104 to execute one or more programs installed in the summary generation device 10. The summary generation device 10 also uses storage units such as a text DB 121 and a feature storage unit 122. These storage units can be achieved by, for example, the auxiliary storage device 102, a storage device that can be connected to the summary generation device 10 via a network, or other devices.

Figure 3:
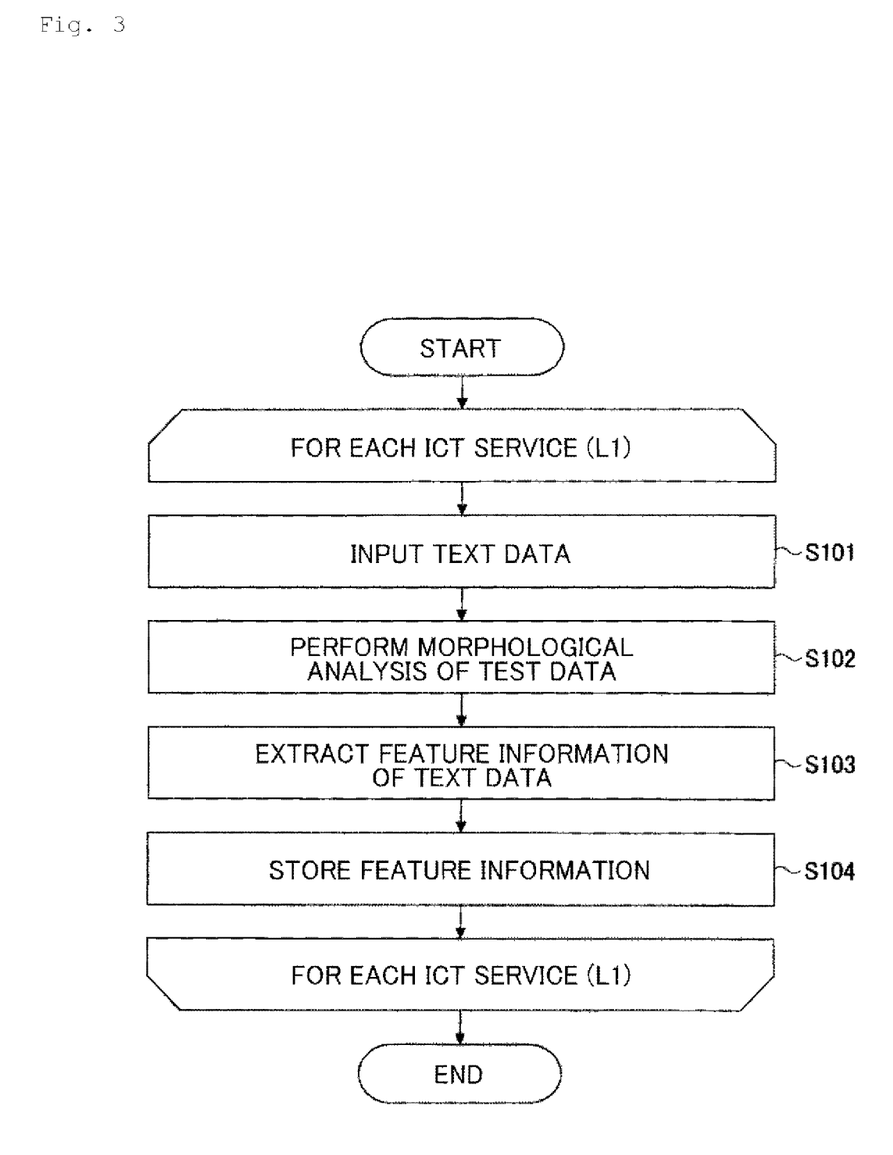
FIG. 3 is a flowchart for describing an example of the processing procedure for extracting the feature information of an ICT service.

The processing procedure executed by the summary generation device 10 will be described below. FIG. 3 is a flowchart for describing an example of the processing procedure for extracting the feature information of an ICT service. In FIG. 3, a loop L1 (steps S101 to S104) is executed for each ICT (Information and Communication Technology) service for which text data is stored in the text DB 121. The text data of the ICT service is, for example, text data in which examples of contribution to the Sustainable Development Goals (SDGs) are described. However, electronic explanatory documents related to an ICT service, such as text data describing an overview and effects of the ICT service, may be stored in the text DB 121 as the text data for the ICT service. The text data may also be collected from websites. The ICT service to be processed by loop L1 is referred to below as the "target service".

In step S101, the morphological analysis unit 111 inputs the text data (referred to below as the "target text data") of the target service. It should be noted that the text DB 121 stores the text data in association with the identification information (such as the service name) of the ICT service.

Subsequently, the morphological analysis unit 111 performs the morphological analysis of the target text data and extracts the components (morphemes) of the target text data (S102). The morphological analysis may be performed using a morphological analysis tool such as, for example, JUMAN, MeCab, or ChaSen.

Subsequently, the feature calculation unit 112 extracts (calculates) one or more pieces of feature information (referred to below as the "service feature") of the target text data based on the result (the components of the target text data) of the morphological analysis (S103). The feature calculation unit 112 extracts (calculates) the service feature by using natural language processing such as, for example, a Tf-idf method, a co-occurrence analysis, or a dependency analysis or a text mining technology. For example, a dependency analysis tool such as CaboCha may be used for the dependency analysis. A library such as pyfpgrowth may be used for the co-occurrence degree analysis.

For example, when the target service is the "ICT buoy" and the target text data is the Web document published on "https://www.nttdocomo.co.jp/biz/service/ict_bui/", for example, a set of the service features as described below is extracted as a result of the dependency analysis between nouns (noun—noun).

salinity—data
salinity—sea
mobile phone—check
work details—storage
maximum value—display
:

It should be noted that the feature calculation unit 112 may vectorize (quantify) the service features described above. Specifically, the feature calculation unit 112 may covert the nouns to distributed representations using Word2Vec, and use the average of the distributed representations between nouns in a dependency relationship as the value of the service feature between these nouns. For example, in the case of "salinity—data", the average of the distributed representation of "salinity" and the distributed representation of "data" may be the service feature. Alternatively, the distributed representations of the nouns may be added and normalized to obtain the service feature.

Subsequently, the feature calculation unit 112 stores, in the feature storage unit 122, a set of the service features calculated in step S103 in association with the identification information (for example, the service name) of the target service (S104).

The loop L1 is executed for each of ICT services, whereby a set of service features of the plurality of ICT services is stored in the feature storage unit 122.

Figure 4:
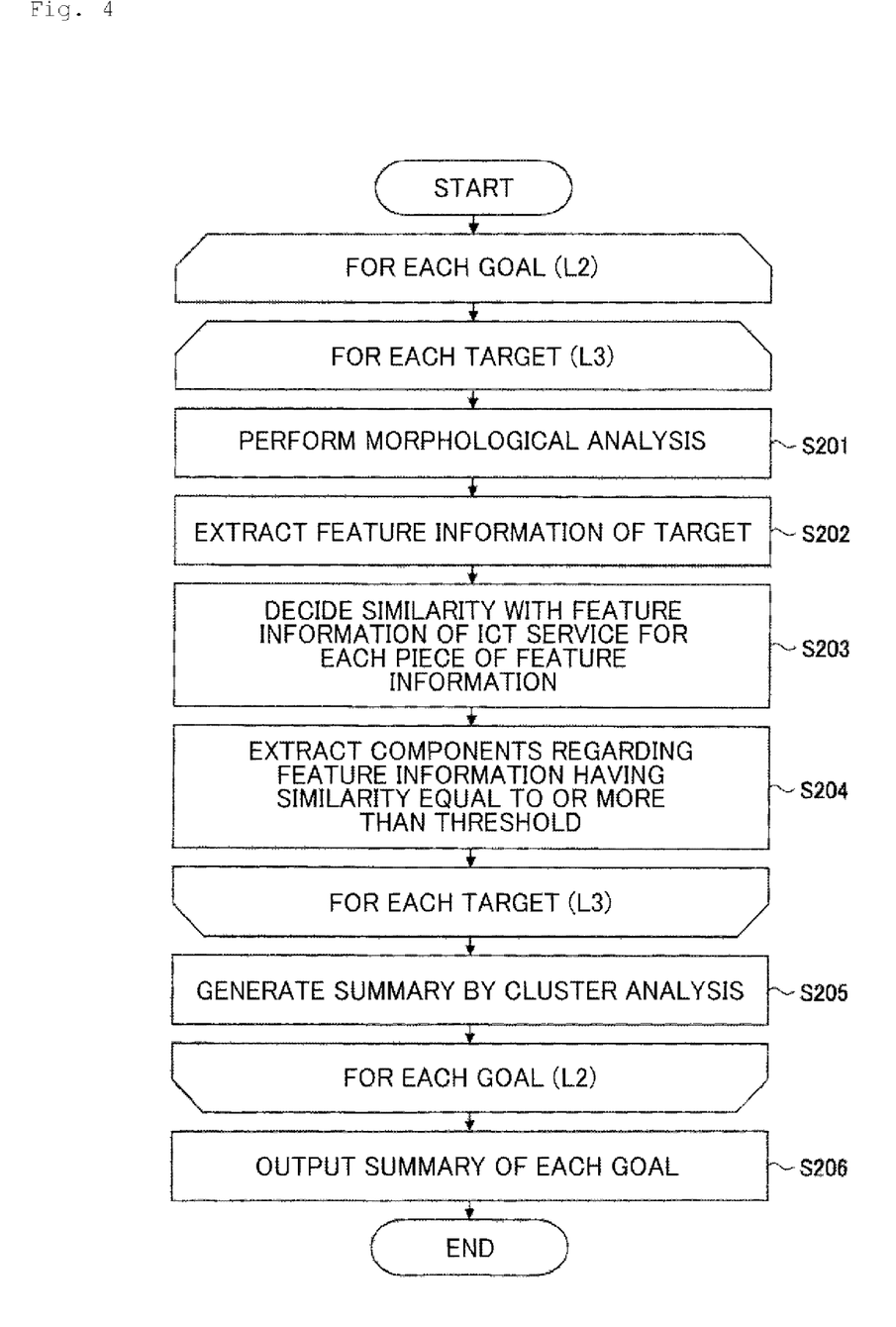
FIG. 4 is a flowchart for describing an example of the processing procedure for generating summaries of goals of the SDGs.

FIG. 4 is a flowchart for describing an example of the processing procedure for generating summaries of the goals of the SDGs.

In FIG. 4, loop processing L2 is executed for each of the 17 goals of the SDGs. The goals that are the processing targets in the loop processing L2 are referred to below as the "target goals". In addition, the loop processing L3 in the loop processing L2 is executed for each of the targets belonging to the target goals of the 169 targets. The target that is the processing target in the loop processing L3 is referred to below as the "processing target".

Figure 5:
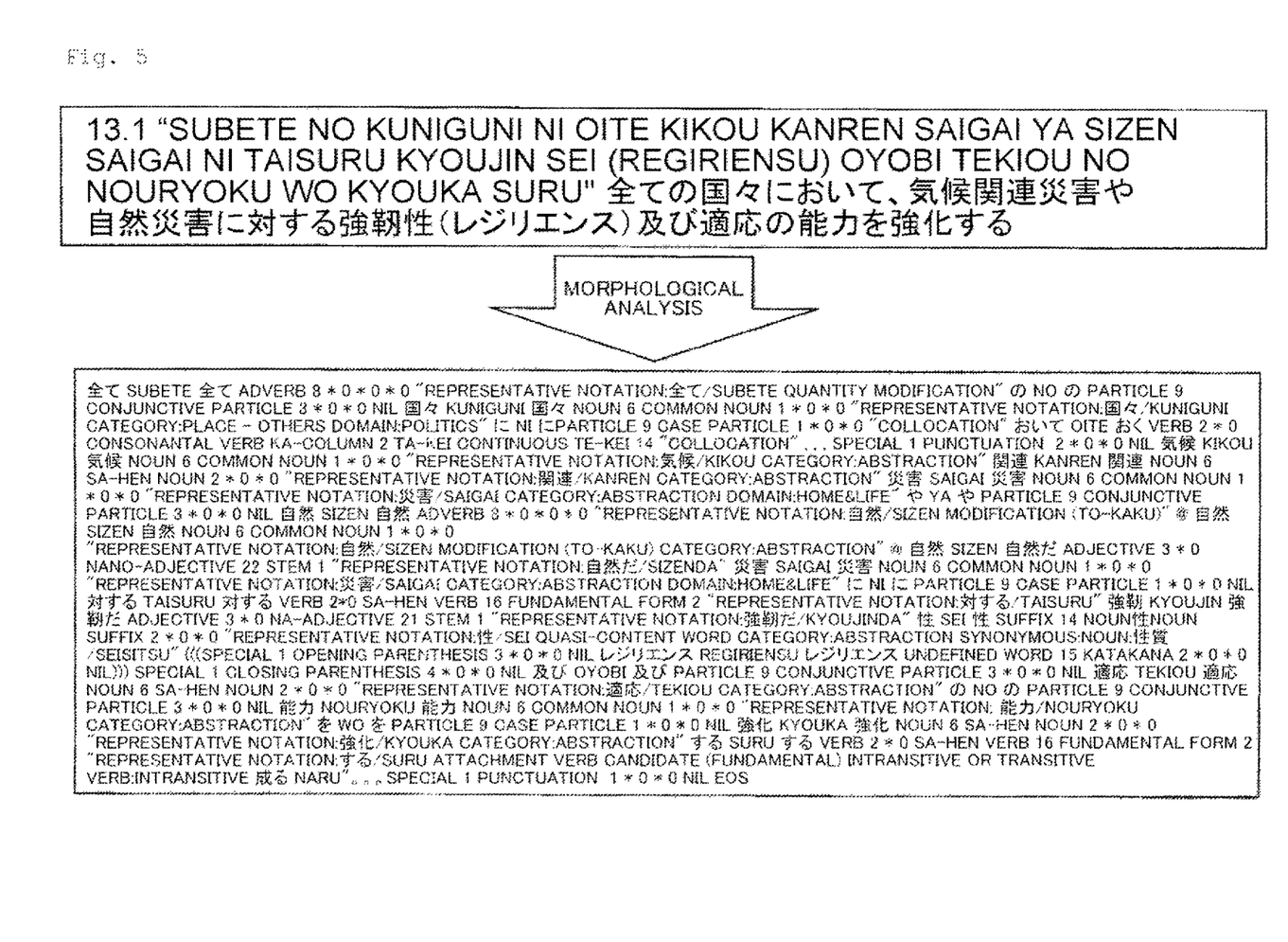
FIG. 5 is a figure illustrating an example of the result of a morphological analysis of a target document.
Figure 6:
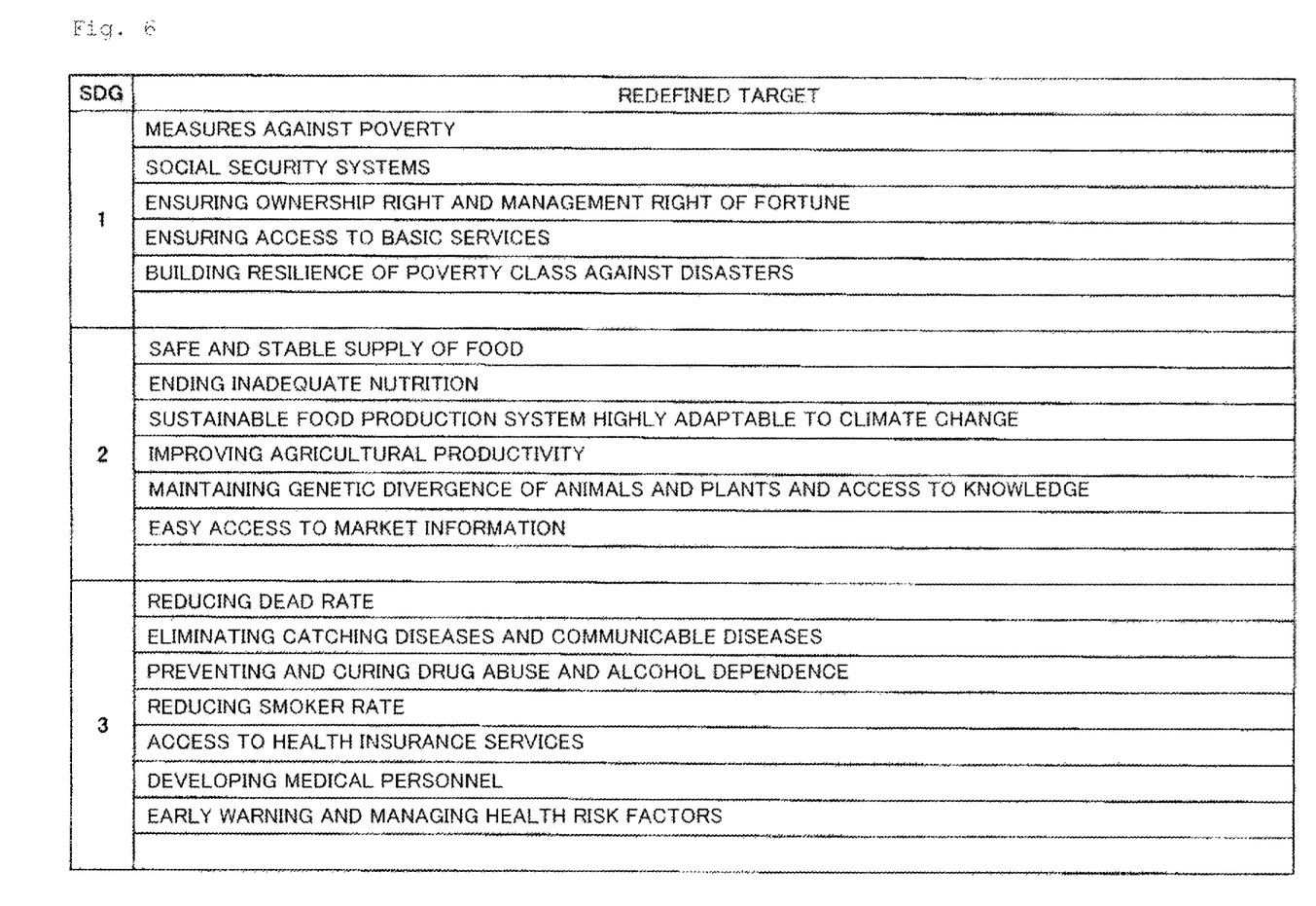
FIG. 6 is a figure illustrating an output example of summaries of goals of the SDGs.
Figure 7:
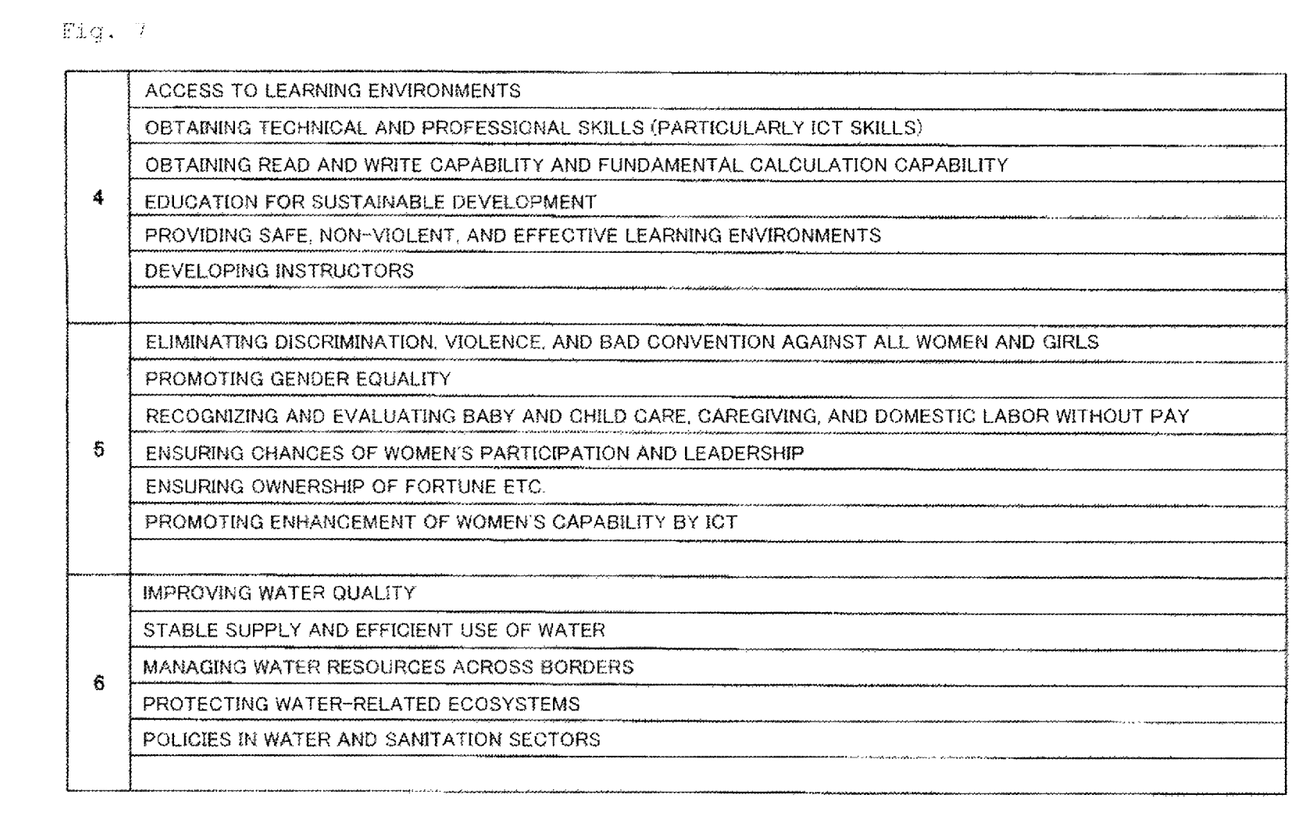
FIG. 7 is a figure illustrating an output example of summaries of goals of the SDGs.
Figure 8:
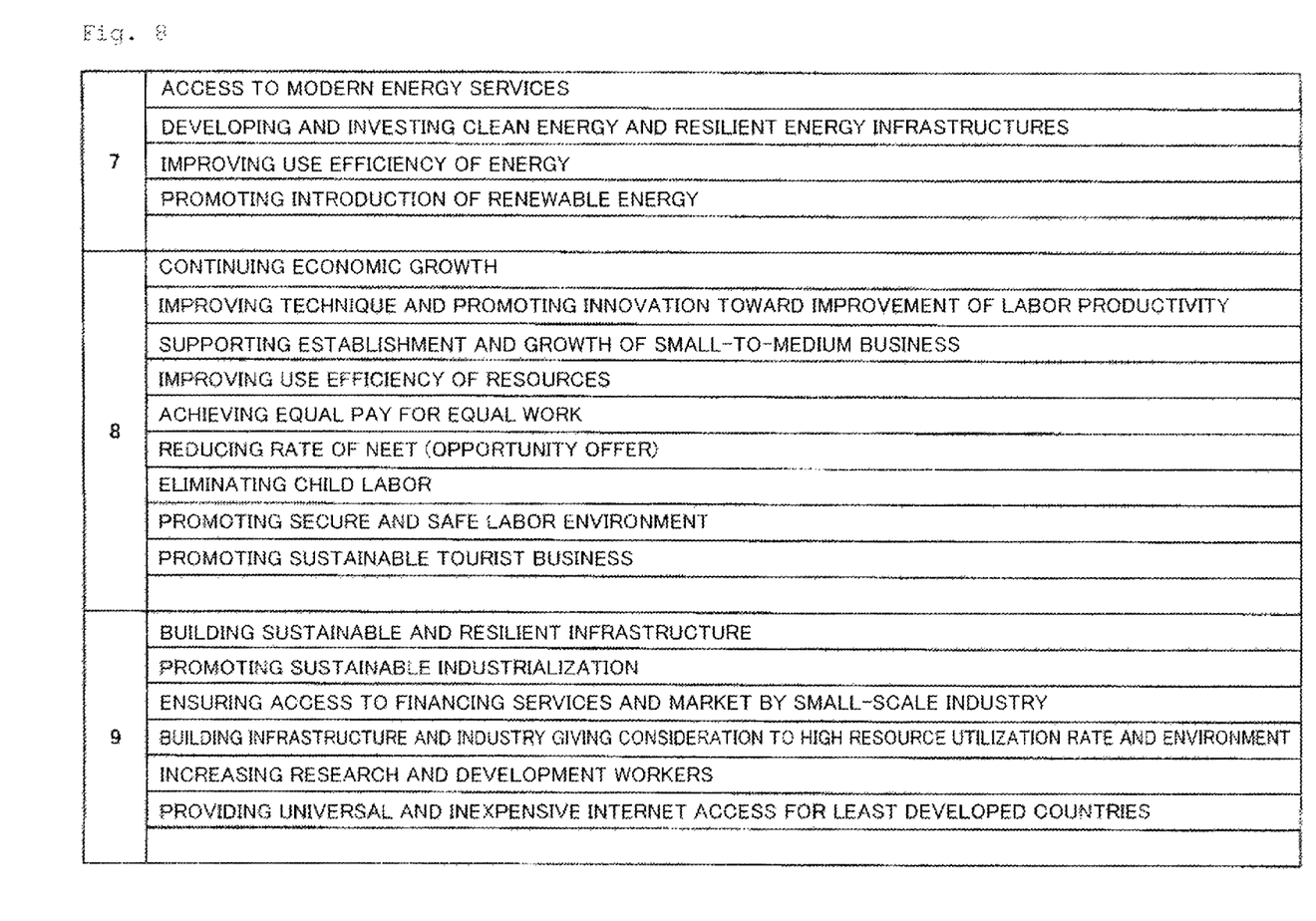
FIG. 8 is a figure illustrating an output example of summaries of goals of the SDGs.
Figure 9:
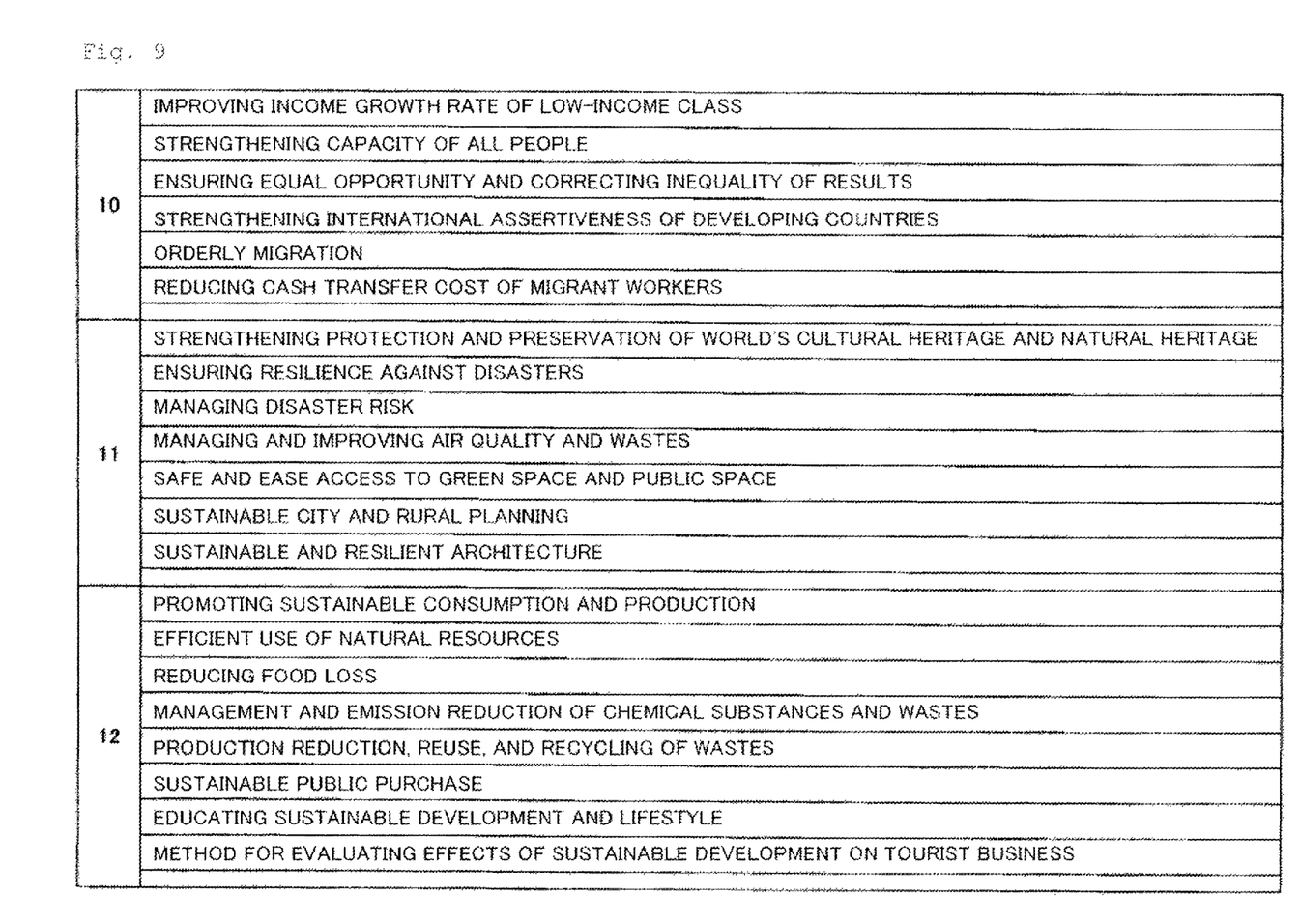
FIG. 9 is a figure illustrating an output example of summaries of goals of the SDGs.
Figure 10:
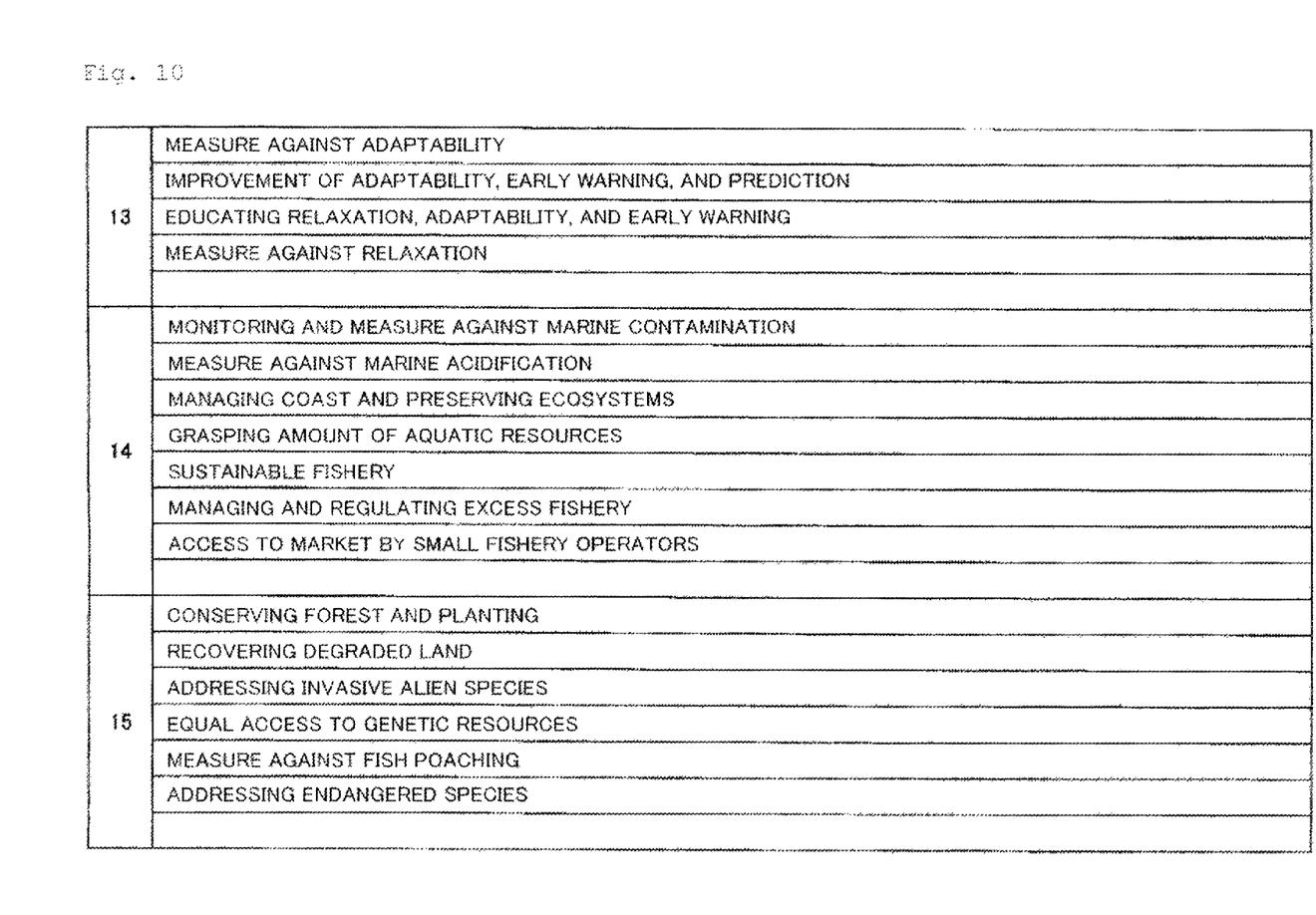
FIG. 10 is a figure illustrating an output example of summaries of goals of the SDGs.
Figure 11:
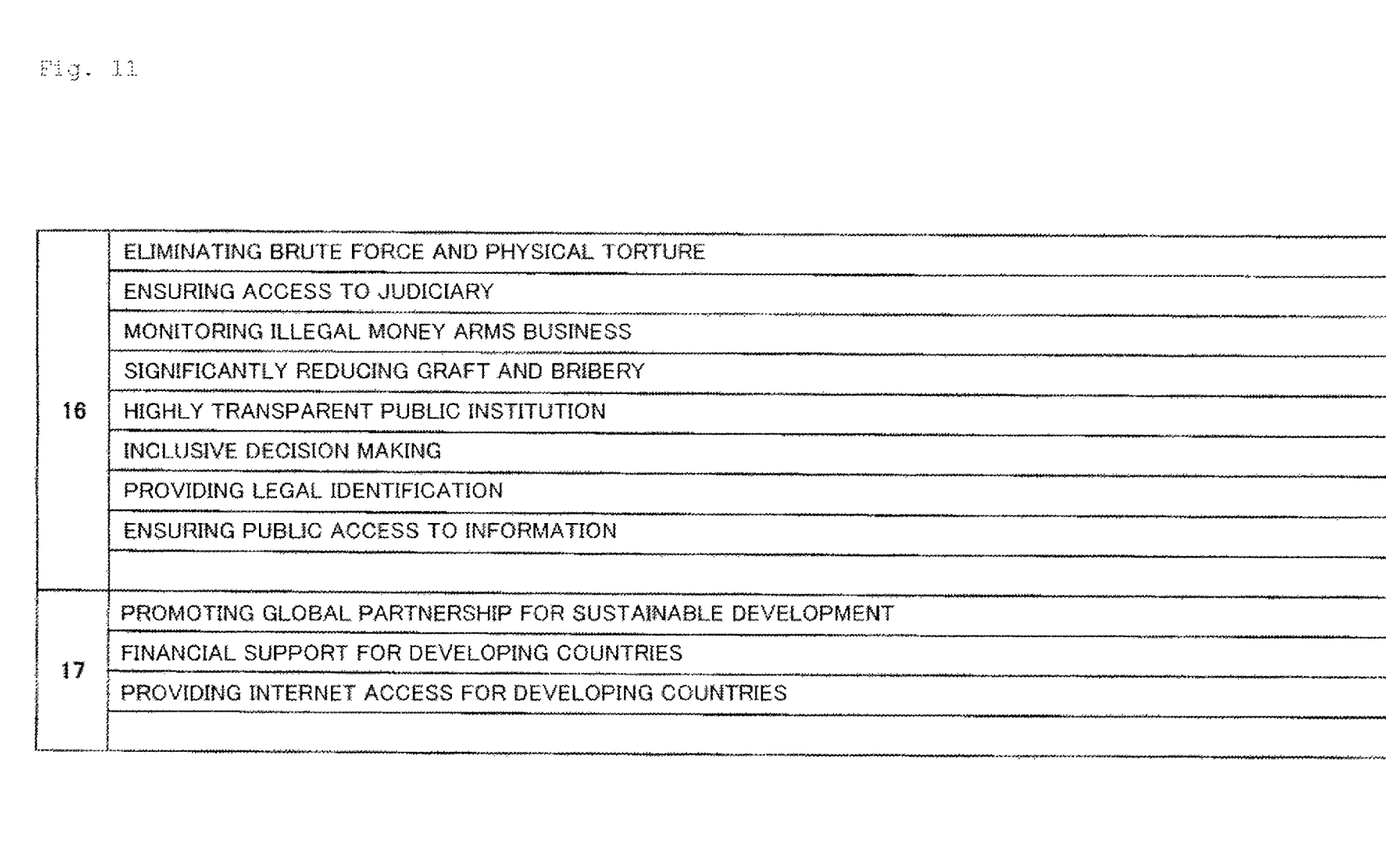
FIG. 11 is a figure illustrating an output example of summaries of goals of the SDGs.

In step S201, the morphological analysis unit 12 performs the morphological analysis of text data (referred to below as the "target document") in which the processing target is described to extract the components (morphemes) of the target document. The method of the morphological analysis may be the same as that of the morphological analysis by the morphological analysis unit 111. It should be noted that FIG. 5 illustrates an example of the result of a morphological analysis of the target document ("Strengthen resilience and adaptive capacity to climate-related hazards and natural disasters in all countries") of target 13.1.

Subsequently, the syntax analysis unit 13 extracts one or more pieces of feature information of the target document by performing the syntax analysis of the target document based on the result (components of the target document) of the morphological analysis of the target document (S202). It should be noted that the syntax analysis may be the same as the processing performed by the feature calculation unit 112. Accordingly, in the case of a dependency analysis (noun—noun), a set of words or phrases such as "natural disasters—adaptability:" is obtained as a set of feature information (referred to below as a target feature). When the service feature calculated by the feature calculation unit 112 is a vector (distributed representation), the syntax analysis unit 13 only needs to vectorize the target features in the same way as in the feature calculation unit 112. That is, the feature information that can be compared with the feature information of the text data of an ICT service about the target document can be obtained by the syntax analysis unit 13.

Subsequently, the decision unit 14 decides (calculates) the similarity with each of the service features stored in the feature storage unit 122 for each of the target features obtained in step S202 (S203). At this time, the service features for which the similarity with the target features is decided do not need to be all the service features stored in the feature storage unit 122 and may be limited to the service features regarding one or more ICT service known to contribute to the processing targets. For example, the correspondence information between targets and the ICT services that contribute to the targets may be stored in advance in the auxiliary storage device 102 or the like. The decision unit 14 decides (calculates) the similarity with the service features regarding the ICT services corresponding to the processing targets in the correspondence information for each of the target features obtained in step S202. For example, when the number of target features is N and the number of service features regarding the one or more of ICT services is M, M similarities are calculated for each of the N target features. It should be noted that known indexes only need to be used as the similarities. For example, cosine similarity may be used.

Subsequently, the decision unit 14 extracts the words or phrases (components of the target document) regarding the target features having a similarity (which is one of the M similarities in the example described above) equal to or more than a threshold (for example, equal to or more than 0.6 in the case of, for example, cosine similarity) from the set of target features obtained in step S202 (S204). That is, the components that are highly related to the ICT services are extracted from the target document.

After the loop processing L3 is performed for all the targets belonging to the target goals, the summary generation unit 15 performs a cluster analysis of the set of words or phrases extracted in step S204 of the loop processing L3, classifies them into clusters, and generates the result of classification into the clusters as the summaries of the target goals (S205). This generates the summaries of the target goals in which duplicate words or phrases are avoided. It should be noted that, for example, a Topic model may be used for the cluster analysis.

After the loop processing L2 is performed for all the 17 goals, the summary output unit 16 outputs the summaries generated for the goals (S206). For example, the summaries of the goals may be displayed on the display device of a terminal that can be operated by the user (for example, an expert familiar with SDGs). At this time, parts of the summaries may be edited (corrected) by the user for easier understanding.

FIGS. 6 to 10 are figures illustrating output examples of summaries of the goals of SDGs. The summaries of the goals are divided into a plurality of lines and this division is based on the result of classification into the clusters in step S205. That is, each line corresponds to one cluster and the words and the like included in each line apply to the words and the like classified into the cluster corresponding to the line.

As described above, according to the embodiment, the causal relationship indicating contribution of an ICT service is reflected, the components are extracted from the target document of SDGs, and the summaries of the goals are generated based on the components. That is, since the service features regarding the effect target and the usage of an ICT service is used, the causal relationship indicating contribution can be reflected. In addition, by performing the cluster analysis of the target features extracted using the service features, it is possible to generate an appropriately summarized goal in which duplication is avoided. This can generate a summary that facilitates the decision of the goal of the SDGs to which an ICT service contributes.

It should be noted that the service feature extraction unit 11 in the embodiment is an example of the first extraction unit. The morphological analysis unit 12 and the syntax analysis unit 13 are examples of the second extraction unit. The summary generation unit 15 is an example of the generation unit. The summary output unit 16 is an example of the output unit. The service feature is an example of the first feature information. The target feature is an example of the second feature information.

Although an embodiment of the present invention has been described in detail above, the present invention is not limited to the specific embodiment described above, and various modifications and changes can be made within the concept of the present invention described in the claims.

REFERENCE SIGNS LIST

10 summary generation device
11 service feature extraction unit
12 morphological analysis unit
13 syntax analysis unit
14 decision unit
15 summary generation unit
16 summary output unit
100 drive device
101 recoding medium
102 auxiliary storage device
103 memory device
104 CPU
105 interface device
111 morphological analysis unit
112 feature calculation unit
121 text DB
122 feature storage unit
B bus

The invention claimed is:
1. A summary generation device comprising:
a processor; and
a memory storing program instructions that cause the processor to:
extract, based on a result of executing a term frequency-inverse document frequency (tf-idf) method on components of text data regarding an information and communication technology (ICT) service, one or more pieces of first feature information from the text data;

extract, based on a result of executing the tf-idf method on components of each target belonging to a plurality of goals of sustainable development goals (SDGs), one or more pieces of second feature information from the target, wherein the plurality of goals of SDGs are categorized into a predetermined number of types;

determine a degree of similarity between the first feature information and each of the one or more pieces of second feature information; and generate a result of a cluster analysis of a set of the components that correspond to each piece of second feature information having the degree of similarity equal to or more than a threshold among the one or more pieces of second feature information, the result of the cluster analysis being a summary categorized by the types of the goals and derived from the SDGs, wherein duplicate words or phrases are avoided in the summary by performing the cluster analysis on the components that correspond to the piece of second feature information having the degree of similarity equal to or more than the threshold.

2. The summary generation device according to claim 1, wherein the processor performs a morphological analysis of the text data based on natural language processing to extract the first feature information and receives a result of the morphological analysis.

3. The summary generation device according to claim 1, wherein the processor performs a morphological analysis of the target based on natural language processing to extract the second feature information and receives a result of the morphological analysis.

4. The summary generation device according to claim 1, wherein the program instructions further cause the processor to output the generated summaries.

5. The summary generation device according to claim 1, wherein the program instructions further cause the processor to:

output the generated summary of the goals derived from the SDGs to a terminal that is adapted to allow a user to edit the summary of the goals derived from the SDGs.

6. The summary generation device according to claim 1, wherein the degree of similarity between the first feature information and each of the one or more pieces of second feature information is determined based on cosine similarity.

7. The summary generation device according to claim 1, wherein the program instructions further cause the processor to:

determine a dependency between two nouns selected from the first feature information of the text data.

8. A summary generation method that causes a computer to execute a procedure comprising:

extracting, based on a result of executing a term frequency-inverse document frequency (tf-idf) method on components of text data regarding an information and communication technology (ICT) service, one or more pieces of first feature information from the text data;

extracting, based on a result of executing the tf-idf method on components of each target belonging to a plurality of goals of sustainable development goals (SDGs), one or more pieces of second feature information from the target, wherein the plurality of goals of SDGs are categorized into a predetermined number of types;

determining a degree of similarity between the first feature information and each of the one or more pieces of second feature information; and generating a result of a cluster analysis of a set of the components that correspond to each piece of second feature information having the degree of similarity equal to or more than a threshold among the one or more pieces of second feature information, the result of the cluster analysis being a summary categorized by the types of the goals and derived from the SDGs, wherein duplicate words or phrases are avoided in the summary by performing the cluster analysis on the components that correspond to the piece of second feature information having the degree of similarity equal to or more than the threshold.

9. A non-transitory computer-readable storage medium that stores therein a program that causes a computer to execute the method of claim 8.

* * * * *